(12) United States Patent  
Pan (10) Patent No.: US 8,453,359 B2
(45) Date of Patent: Jun. 4, 2013

(54) AIR-FEED DEVICE OF BOILER IRON AND BOILER IRON

(75) Inventor: Chienchih Pan, Tainan (TW)

(73) Assignee: Tsann Kuen (China) Enterprise Co., Ltd, Xiamen (CN)

( * ) Notice: Subject to any disclaimer, the term of this patent is extended or adjusted under 35 U.S.C. 154(b) by 181 days.

(21) Appl. No.: 12/997,797

(22) PCT Filed: Jun. 11, 2009

(86) PCT No.: PCT/CN2009/072233
§ 371 (c)(1),
(2), (4) Date: Mar. 30, 2011

(87) PCT Pub. No.: WO2009/149664
PCT Pub. Date: Dec. 17, 2009

(65) Prior Publication Data
US 2011/0167683 A1 Jul. 14, 2011

(30) Foreign Application Priority Data
Jun. 13, 2008 (CN) .......................... 2008 2 0102666

(51) Int. Cl.
*D06F 75/20* (2006.01)
*D06F 75/00* (2006.01)

(52) U.S. Cl.
USPC .......................................................... 38/77.5

(58) Field of Classification Search
USPC ............................................. 38/74–77.83, 93
See application file for complete search history.

(56) References Cited

U.S. PATENT DOCUMENTS

| 5,038,501 | A | * | 8/1991 | Hipp et al. | 38/77.5 |
| 5,638,622 | A | * | 6/1997 | Hohn | 38/77.5 |
| 5,855,081 | A | * | 1/1999 | Cuesta et al. | 38/77.5 |
| 6,249,996 | B1 | * | 6/2001 | Dorber et al. | 38/77.5 |

FOREIGN PATENT DOCUMENTS

| CN | 1729333 A | 2/2006 |
| CN | 2786175 Y | 6/2006 |
| CN | 1894461 A | 1/2007 |
| CN | 201224843 Y | 4/2009 |
| EP | 0999303 A2 | 5/2000 |
| EP | 1724390 A1 | 11/2006 |

* cited by examiner

Primary Examiner — Ismael Izaguirre
(74) Attorney, Agent, or Firm — Rabin & Berdo, P.C.

(57) ABSTRACT

An air-feed device and boiler iron has a three-station guiding valve. The body contains an air inlet linking boiler and two air outlets located in two sides of a guiding valve. The first outlet links wet vapor snoot of iron and the second links heating plate of boiler. One end of a valve rod of the guiding valve is in the valve body and links to a fixed valve plug. The other end is led outside through an opening in the top of body. When the valve rod rests at any one of the stations, the valve plug blocks a desired combination of air outlets and/or inlets.

9 Claims, 6 Drawing Sheets

AIR-FEED DEVICE OF BOILER IRON AND BOILER IRON

FIELD OF THE INVENTION

The present invention relates to an accessory of iron, more particularly, an accessory, which is devised in boiler iron between the air outlet of boiler and the air outlet of iron, it can choose different ways of air feed; and the invention relates to boiler iron with this accessory.

BACKGROUND OF THE INVENTION

Presently, boiler iron is provided wet vapor as air by boiler parts, wet vapor heated by heating plate forms dry vapor before it ejects to fabric, and boiler iron works. But, vapor is inapplicable to iron some fiber fabric because of high temperature, thus wet vapor provided by boiler should ejects directly to fabric, then boiler iron works. To choose between two ways of air-feed is impossible, because in boiler iron the air outlet of iron links the air outlet of boiler through hose directly.

SUMMARY OF THE INVENTION

The primary object of the present invention is to provide an air-feed device of boiler iron, the device provides wet vapor directly or dry vapor which forms from wet vapor heated by heating board to fabric.

The another object of the present invention is a kind of boiler iron which works by means of choosing wet vapor and dry vapor effectively.

The technical proposal of the present invention: a air-feed device of boiler iron, it has a three-station guiding valve whose body contains an air inlet linking boiler and two air outlets located in two sides of guiding valve, the first air outlet links wet vapor snoot of iron and the second links heating plate of boiler; one end of valve rod of guiding valve is in valve body and links with a fixed valve plug, another end which is located relatively to the first end is led outside through an opening in the top of body; when valve rod lies the first station, the valve plug blocks between the first air outlet and the second air outlet, the second air outlet links the air inlet through inner air of valve body; when valve rod lies the second station, the valve plug blocks between the second air outlet and the air inlet, the first air outlet links the air inlet through inner air of body; when valve rod lies the third station, the valve plug blocks during the first air outlet, the second air outlet and the air inlet, the first air outlet, the second air outlet and the air inlet links each other through inner air of body.

A restoring spring used to push valve plug is located between the valve plug and the bottom of body in valve body.

The second end of valve rod is led outside through an opening in top of body of valve.

Valve rod is set a gland ring which seals the interval between valve rod and valve body.

The chamber in the valve body is a stepped blind hole. The first end of valve rod and valve plug are located in small end all along; a salient shoulder with comparable size to inside diameters of big end is located in big end of body all along, and gland ring covers valve rod and presses against the inner circular face of salient shoulder.

A boiler iron comprises an iron, a vapor boiler and three stations guiding valve, valve body of guiding valve contains an air inlet linking boiler and two air outlet located in two sides of guiding valve, the first air outlet links wet vapor snoot of iron and the second links heating plate of boiler; one end of the valve rod of guiding valve is in valve body and links with a fixed valve plug, another end which is located relatively to the first end is led outside through an opening in the top of body of valve; when valve rod lies the first station, the valve plug blocks between the first air outlet and the second air outlet, the second air outlet links the air inlet through inner air of body; when valve rod lies the second station, the valve plug blocks between the second air outlet and the air inlet, the first air outlet links the air inlet through inner air of body; when valve rod lies the third station, the valve plug blocks during the first air outlet, the second air outlet and the air inlet, the first air outlet, the second air outlet links the air inlet through inner air of body.

In preferred embodiment, guiding valve mentioned above is set in iron, and shift component which controls three stations to mutually shift and locate; the shift component presses against valve rod of guiding valve. It is easy to operator to use shift component of iron directly and adjust usage mode of boiler iron rapidly.

In an preferred embodiment structure, to fit operator who is fond of pushing to operation: shift component comprises horizontal axis which aslant moves when button is pressed and locating block of stalls which links valve rod of guiding valve, the locating block has wavy surface to sliding contact with the horizontal axis, three troughs correspond to three stalls in the wavy surface.

Or in another preferred embodiment structure, to fit operators who like rotating to operate: shift component has rotating locating bowl of stalls, there is a opening in side wall of locating bowl, surface of breach presses against valve rod of guiding valve and has two parallel lines at least, and rim linking locating block of stalls constitutes positioning surface corresponding to three stalls.

In the present invention, air-feed device of boiler iron mentioned above drives the valve plug within valve body to stay in one of three-station through valve rod of guiding valve, supplies wet vapor by vapor boiler through air inlet of guiding valve and heats it by heating board to form dry vapor; or it ejects wet vapor provided by vapor boiler outwards directly from snoot of iron through the first air outlet of guiding valve; or it ejects wet vapor provided by vapor boiler outwards through the first gas outlet and snoot of iron, at the same time the wet vapor passes through the second air outlet and gets the heating plate of iron, then wet vapor forms dry vapor by heating plate before it ejects to fabric; thereby works in three way of air feed. The guiding valve has simple structure and is operated conveniently. To coordinate guiding valve to set up location and release of three stations, valve body adopts structure that restoring spring pushes valve plug in it. Valve rod has gland ring, which seals interval between valve rod and inner wall of body of valve, forbids wet vapor from air inlet to body of valve letting out through interval between valve deck and valve rod and improves safety of guiding valve. To maintain the gland ring in optimal status when it is pushed by the salient shoulder in the big end of the body, the body of the valve adopts a stepped blind hole structure that coordinates with the valve rod and the salient shoulder. In the present invention, boiler iron with air feed device mentioned above, drives the valve plug within valve body to stay in one of three-station through valve rod of guiding valve, supplies wet vapor by vapor boiler through air inlet of guiding valve and heats wet vapor by heating plate to form dry vapor before it ejects outside; or it ejects wet vapor provided by vapor boiler outwards directly from snoot of iron through the first gas outlet of guiding valve; or it ejects wet vapor provided by vapor boiler outwards through the first gas outlet and snoot of iron, at the same time the wet vapor passes through the second air outlet and gets the heating plate of iron, then wet vapor forms dry vapor by heated before it ejects to fabric; thereby works in three way of air feed. The present invention can cater all kind demand of fabric iron, it has simple structure and is operated conveniently, and is popularized to apply easily.

DETAILED DESCRIPTION OF THE PREFERRED EMBODIMENT

Figure 1:
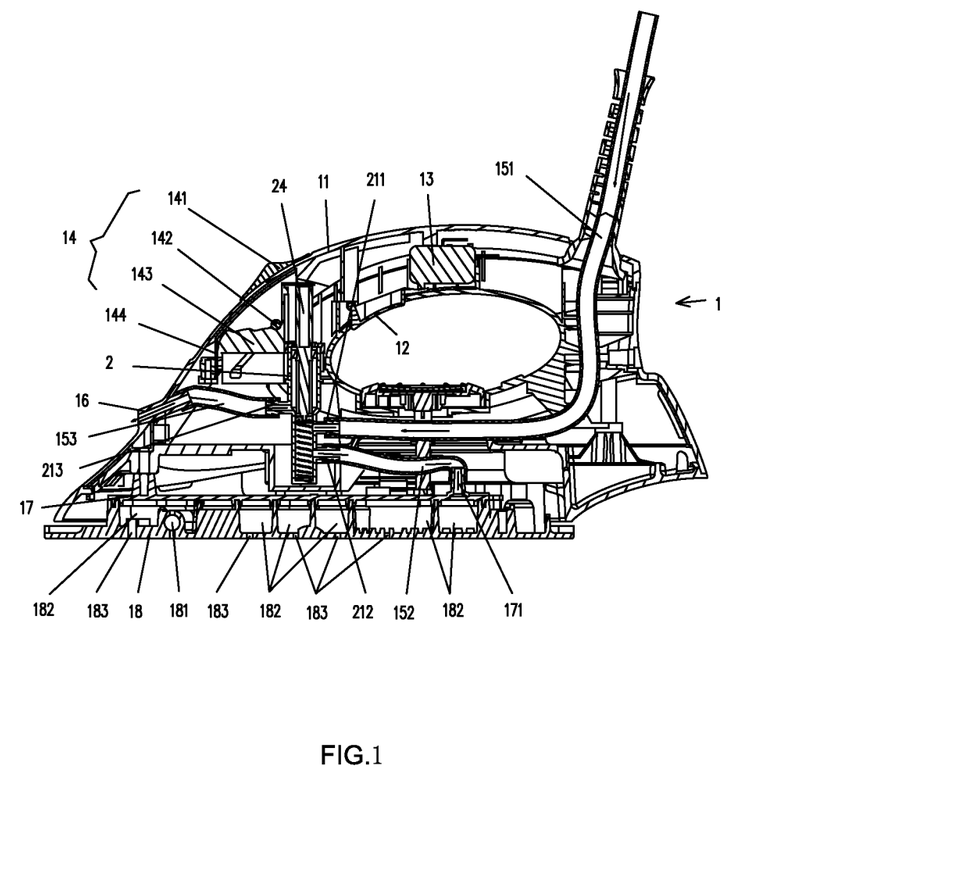
FIG. 1 is a profile view of preferred embodiment of present invention.
Figure 2:
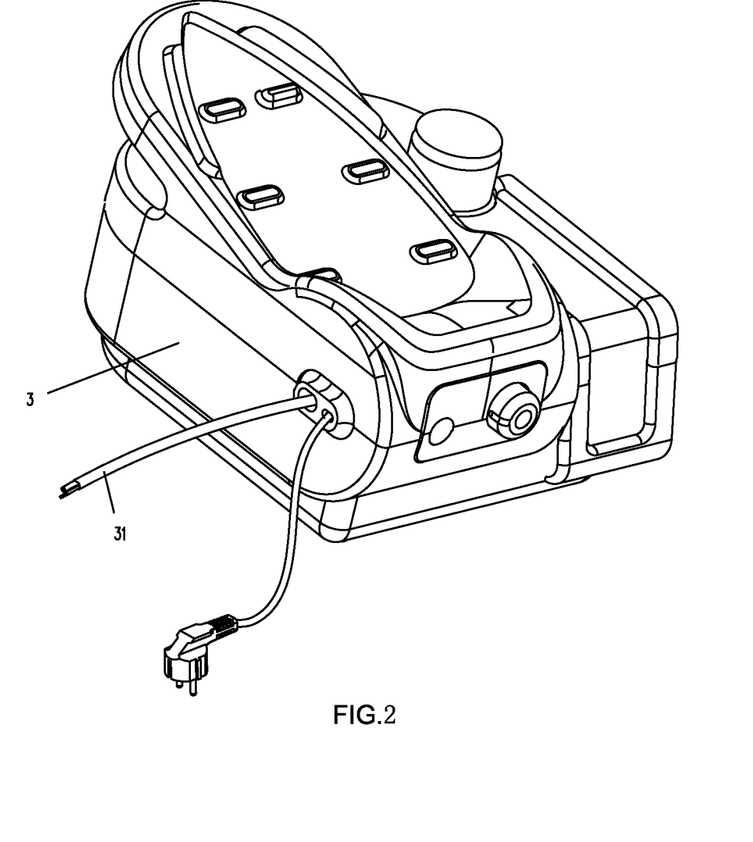
FIG. 2 is a view of boiler of preferred embodiment in FIG. 1.

For the structure of a preferred embodiment of the present invention, refer to FIG. 1 and FIG. 2: an iron 1, a vapor boiler 3, a three-station guiding valve 2 and shift components 14. In preferred embodiment, guiding valve 2 and shift components 14 are installed within valve body 21. In others other preferred embodiments, of course, guiding valve 2 and shift components 14 can be installed in vapor boiler 3, or guiding valve 2 and shift components 14 can keep away from iron 1 and vapor boiler 3 and be set up independent.

Structure of iron parts 1, refer to FIG. 1: handle of shell 11 of iron parts is set a switching push-button 12 and a micro-active switch 13. Back end of the switching push-button 12 withstands moving contacts of micro-active switch 13. Guiding valve 2 and shift component 14 are installed in anterior upside of shell 11. As soon as button 141 of shift component 14 is pushed, shift component 14 makes stalls of valve rod 24 change correspondingly, thereby valve rod 24 optionally stays some selected station and works according to status settled. Air inlet 211 of valve rod 2 links air inlet hose 151, the first air outlet 213 links the first air outlet hose 153 the second air outlet 212 of guiding valve 2 links the second air outlet hose 152. Snoot 16 which links the first air outlet hose 153 is installed in anterior part of shell 11 and links the first air outlet 213 of guiding valve 2 through the first air outlet hose 153. An insulating substrate 17, which has electric heating pipe 181 and heating board 18 with some gas groove 182 linking each other been fixed on the lower surface of insulating substrate 17, is fixed in the under part of shell 11. Heating board 18 and gas groove 182 are covered by insulating substrate 17, that forms air compartment. Upper part of air compartment links the second air outlet hose 152 through snoot 171 of insulating substrate 17, and links the second air outlet 152 of valve rod 2 through the second air outlet hose 212. Lower part of the air compartment links external through the vapor hole 183 of heating board 18.

Structure of vapor boiler 3, refer to FIG. 2: vapor boiler 3 is set a compound pipe which comprises vapor pipe and electric cable 21. To deliver wet vapor to iron parts 1, the vapor pipe of compound pipe 21 links air inlet hose 151 of iron part 1.

There are a pair control lines link micro-active switch 13 of iron 1 in electric cable within compound pipe 21. The micro-active switch 12 controls electromagnetic valve inside vapor boiler 3, in order to control wet vapor produced by vapor boiler 3 to deliver wet vapor to iron parts 1. Electric cable of compound pipe 21 has power line to link electric heating pipe 181 of heating plate 18 of iron parts 1.

Figure 3:
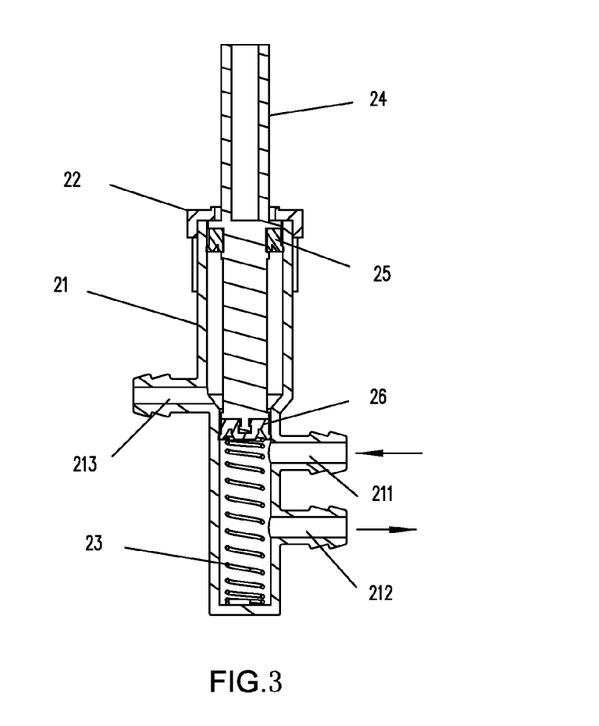
FIG. 3 is a profile view of guiding valve of preferred embodiment in FIG. 1 in the first station.

Structure of valve rod 24, referring to FIG. 3: the chamber in the body of the valve is a stepped blind hole, where the depth of the small end is comparable to the depth of the big end. An air inlet 211 is made in side wall near upper end of valve body 21 to link vapor boiler 3; the second air outlet 212 is made in side wall near middle of valve body 21 to link air compartment 182 on heating plate 18; the first air outlet 213 is made in side wall near lower end of big end to link wet vapor snoot 16. A valve deck 22 with a center hole is set in opening of big end of valve body 21. A restoring spring is made in little end of valve body 21.

A salient shoulder with comparable size to inside diameters of big end is fixed on middle of valve rod 24, gland ring 25 covers valve rod and presses against the inner circular face of salient shoulder. Small end of valve rod 24 links valve plug 26 fixed. The inside end of valve rod 24 and valve plug 26 are located in small end of valve body all along; a restoring spring 23 used to push valve plug 26 is located between the valve plug 26 and the bottom of valve body 21. Salient shoulder and gland ring 25 are in big end of valve rod 24 all along, gland ring 25 seals the interval between the valve rod 24 and valve body 21. The outside end of valve rod 24 is led outside through a center hole in the top of valve body 21.

Guiding valve 2, refer to FIG. 3, valve rod lies the first station, restoring spring 23 is in the most stretched, salient shoulder 25 on valve rod 24 pressed against valve deck 22 on open end of big end of valve rod 24. Valve plug 26 in the upper part of small end of valve body 21 blocks between air outlet 213 and air inlet 211, air outlet 212 links air inlet 211 through internal air of body. Vapor boiler 2 delivers wet vapor to valve body 21 through air inlet 211 of valve rod 24 and provides wet vapor to iron parts 1 through air outlet 212, then this wet vapor is heated by heating plate and forms dry vapor, dry vapor ejects outside through the stream holes in bottom of heating plate 18 of iron parts 1, thereby this mode is used to iron wool, cotton and hemp.

Figure 4:
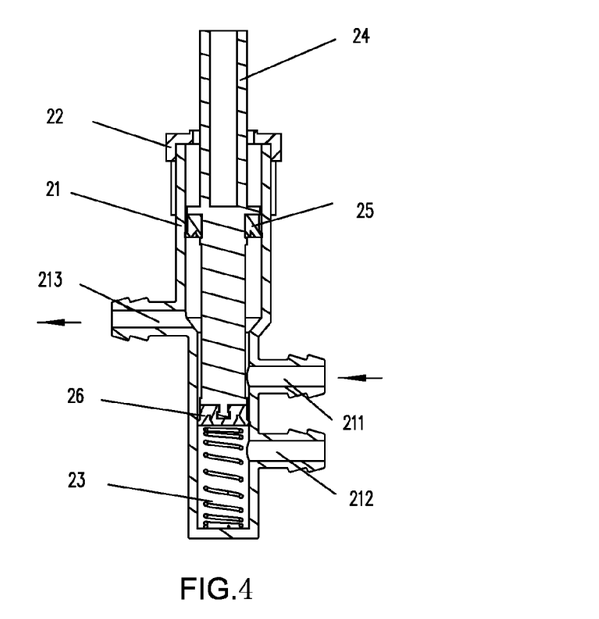
FIG. 4 is a profile view of guiding valve of preferred embodiment in FIG. 1 in the second station.

Valve rod 24 is pushed to the second station, refer to FIG. 4: restoring spring 23 is pressed partly, valve plug 26 in small end of valve body 21 blocks between the second air outlet 212 and air inlet 211, the first air outlet 213 links air inlet 211 by air that come from lower part of bulk and upper part of small end of valve body 21. Vapor boiler 3 delivers wet vapor to valve body 21 through air inlet 211 and provides wet vapor to wet vapor snoot 16 through air outlet 213, then it ejects wet vapor outside by snoot 16. Since vapor boiler 3 refuses to supply power to electric heating pipe 18, this mode is used to iron composite fibrous fabric softly.

Figure 5:
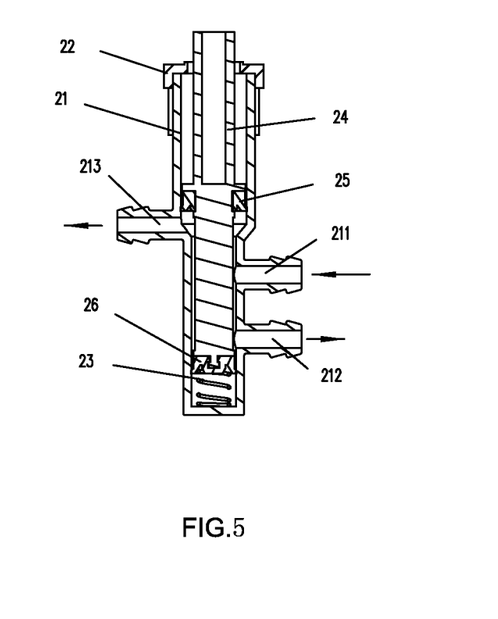
FIG. 5 is a profile view of guiding valve of preferred embodiment in FIG. 1 in the third station.

Valve rod 24 is pushed to the third station, refer to FIG. 5: restoring spring 23 is pressed totally; valve plug 26 lies outside the first air outlet 213, the second air outlet 212 and air inlet 211, air outlet 212, air outlet 213 and air inlet 211 links each other through internal air that come from the lower part of bulk and the middle and upper part of small end of valve body 21. Vapor boiler 3 delivers wet vapor to valve body 21 through air inlet 211 and provides wet vapor to wet vapor snoot 16 through air outlet 213, then it ejects wet vapor outside by snoot 16, and provides this wet vapor to heating plate 18, then this wet vapor is heated by heating plate and forms dry vapor. dry vapor ejects outside through the stream holes 183 in bottom of heating plate 18 of iron parts 1, thereby this mode is used to iron wool, cotton and hemp softly.

Figure 6:
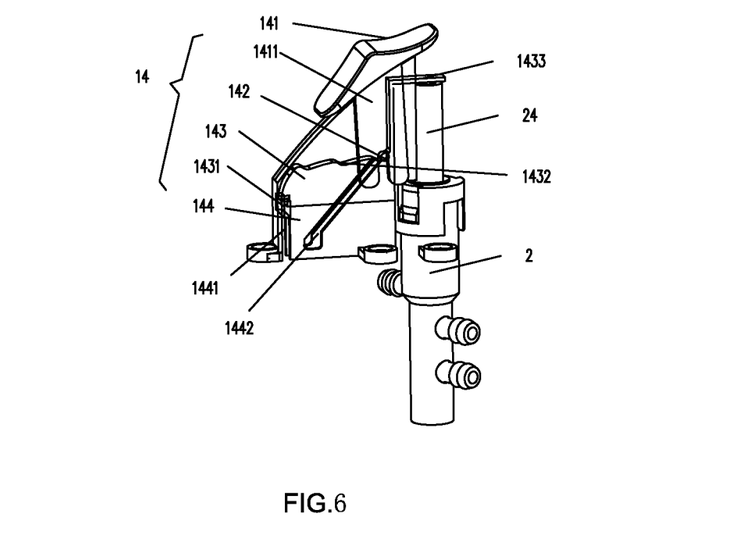
FIG. 6 is a view of shift station structure of preferred embodiment.
Figure 7:
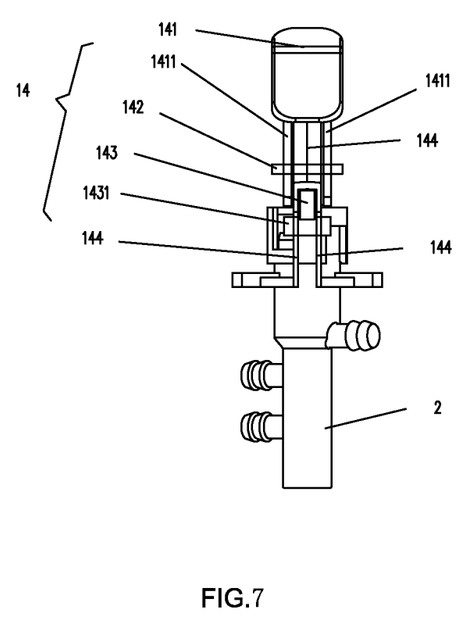
FIG. 7 is another profile view of shift station structure

Structure of shift component 14, refer to FIG. 6 and FIG. 7. Shift structure 14 has a button 141, a copper axle 142, a locating block of stalls 143 and a locating hood of stalls 144. A pair forks, which thrust shell 11, are located separately in two sides of locating hood of stalls 144 in the lower part of button 141. Locating hood of stalls 144 is a twisted metal plate, the lower surface and the rear surface opens; a pair leading breach 1441 of locating blocks are set in anterior part of two profiles; a pair of inclined guide channel 1442 of copper axle 142 is made in two sides of anterior end surface. Locating block of stall 143 appears like Z in general, the anterior part of lower horizontal edge has a plate; the upper surface of lower horizontal edge appears wavy. Three troughs correspond to three stalls. Locating blocks of stalls 143 conceals in locating hood of stall 144, plate of locating block of stall 143 stretches outside from two leading breach 1441; upper horizontal edge stretches backward and presses upon upper end of valve rod 24. Copper axle 142 inserts two guide grooves 1442 of locating hood 144, the middle of which contacts with upper surface 1432 of lower horizontal edge of locating block 143; two sides of which are choked in opening of fork 1441. Usually, restoring spring 23 pushes valve rod 24 upwards; valve rod 24 keeps locating block being shifted upwards. When button 141 of shift component 14 is pressed, fork 1411 presses copper axle 142 downwards and copper axle 142 pushes locating block 143 downwards. Button 141 moves along the declining surface of shell 11 upwards or downwards, at the same time copper axle 142 moves slantwise along two guide groove 1442 of bilateral surface of locating hood 144, there are two motive constituents plumb mutually in this declining move, horizontal constituent changes the position of trough copper axle 142 in upper surface of locating block 143, vertical constituent makes valve rod 24 change stall correspondingly, thereby guiding valve 2 stays optionally in some selected station and works according to planned states.

Figure 8:
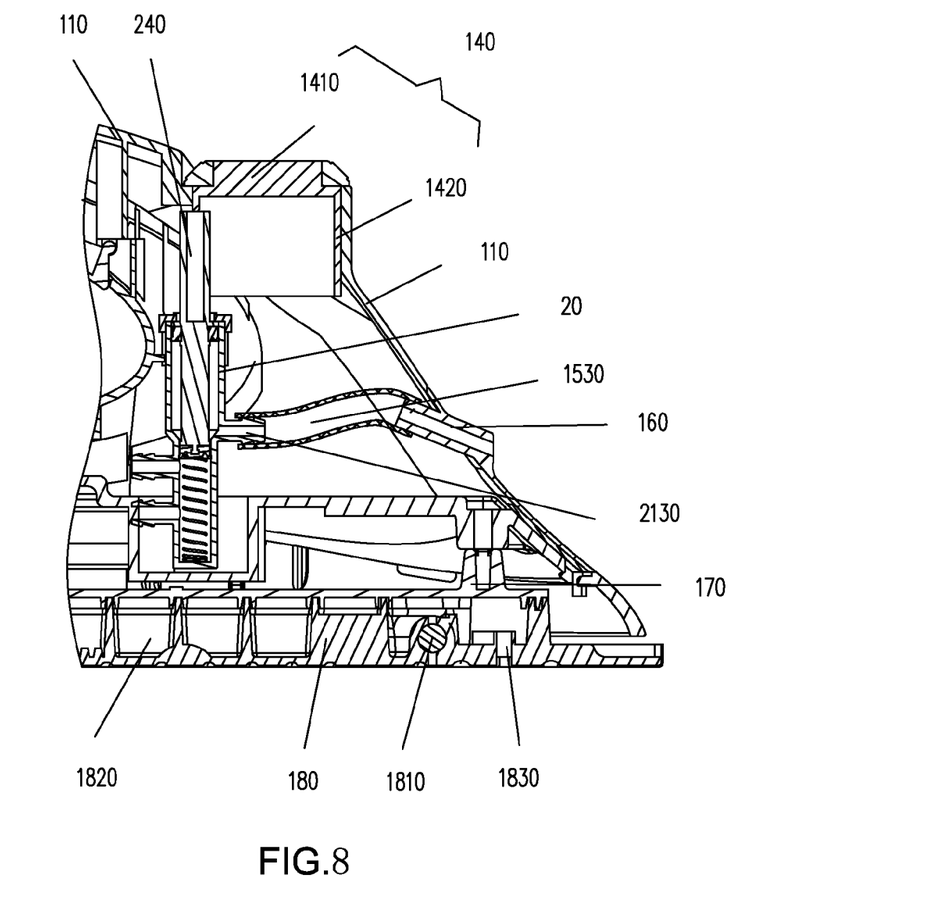
FIG. 8 is partial profile view of iron of another preferred embodiment of the present invention.

Another preferred embodiment of present invention, refer to FIG. 8, guiding valve 20 and shift component 140 are set in anterior and upper part of shell 11. Shift component 140 adopts rotating structure, when the knob 1410 of shift component 140 is rotary, the shift component 140 makes the valve rod 240 change stall correspondingly, thereby guiding valve 20 stays optionally in some selected station and works according to planned states. Air inlet 2110 of guiding valve 20 links inlet hose; the first air outlet 2130 links the first outlet hose 1530; the second air outlet 2120 links the second outlet hose. A snoot, the internal end of which links the first outlet hose 1530, is set in anterior part of shell 110 and links the first air outlet 2130 through the first outlet hose 1530. An insulating substrate 170, which has electric heating pipe 1810 and heating board 180 with some gas groove 1820 linking each other been fixed on the lower surface of insulating substrate 170, is fixed in the lower part of shell 110. Heating board 180 and gas groove 1820 are covered by insulating substrate 170, which forms air compartment. Upper part of air compartment links the second outlet hose through snoot of insulating substrate 170, and links the second air outlet 2120 through the second air outlet hose. Lower part of the air compartment links external through the vapor hole 1830 of heating board 180.

Figure 9:
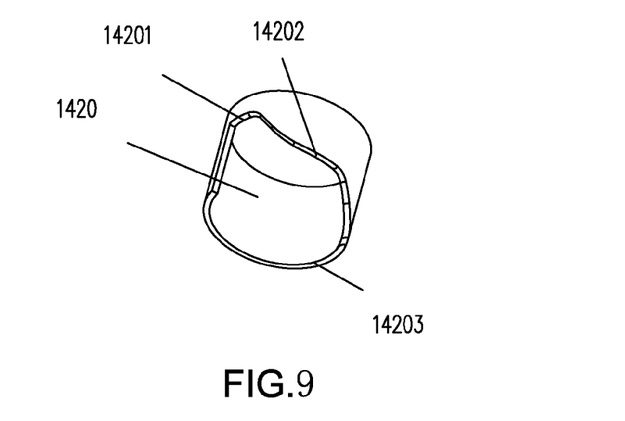
FIG. 9, which is sighted from underside, is a perspective view of locating bowl of stalls of preferred embodiment in FIG. 8.

Shift component 140 has a knob 1410, a locating bowl of stall 1420. Knob is set outside the shell 110 and connects with bottom of locating bowl of stall 1420 steadily. Main body of locating bowl 1420 intercalate shell 110, a breach in its side wall, the surface of breach presses against valve rod 240. Refer to FIG. 9: there are a flat line 14201 near bottom of bowl and a flat line 14202 near middle of bowl in the surface of side wall breach of locating bowl 1420, rim of locating bowl and both of them constitute three stalls. Usually, restoring spring 230 presses valve rod 240 upwards; owing to restraint from locating bowl 1420, valve rod 240 keeps steadily. Locating bowl of stall 1420 turns when rotary knob is turned, flat line 14201, flat line 14202 or rim 14203 of locating bowl 1420 turns at the same time, stall of valve rod 240 of guiding valve 20 shifts correspondingly, thereby guiding valve 20 stays optionally in some selected station and works according to planned states.

The above-mentioned is the optimal embodiment, while extension of present invention isn't restricted. Making equivalent change and modification according to technical proposal of present invention and explanation belong to extension of present invention.

INDUSTRIAL APPLICABILITY

The present invention is a air-feed device of boiler iron, it has three-station guiding valve and provides three way of air-feed, structure of guiding valve is easy, operates conveniently and safe. The boiler iron with air-feed device mentioned above drives the valve plug within valve body to stay in one of three-station through valve rod of guiding valve, supplies wet vapor by vapor boiler through air inlet of guiding valve and heats wet vapor by heating plate to form dry vapor, then it ejects outside. The present invention can cater all kind demand of fabric iron, it has simple structure and is operated conveniently, and is popularized to apply easily.

What is claimed is:

1. An air-feed device of a boiler iron, the boiler iron having a vapor boiler with a heating plate and having a wet vapor snoot configured to discharge wet vapor, the air-feed device comprising:
   a three-position guiding valve having a body, the body of the guiding valve including a valve chamber therein, the valve chamber having an air inlet connected to the boiler, and having first and second air outlets,
   wherein the first air outlet is connected to the wet vapor snoot and the second air outlet is connected to the heating plate;
   a valve rod disposed in the valve body and having a proximal end and a distal end; and
   a valve plug attached to the distal end of the valve rod, wherein:
   when the valve rod is in a first position, the valve plug blocks the valve chamber between the first air outlet and the air inlet, and only the second air outlet is connected to the air inlet through the valve body,
   when the valve rod is in a second position, the valve plug blocks the valve chamber between the second air outlet and the air inlet, and only the first air outlet is connected to the air inlet through the valve body, and
   when the valve rod is in a third position, the valve plug does not block the valve chamber between any of the first air outlet, the second air outlet and the air inlet, whereby the first air outlet, the second air outlet and the air inlet are all connected to each other through the valve body.

2. The air-feed device according to claim 1, further comprising a restoring spring located in the valve body between the valve plug and a bottom of the valve body and configured to push the valve plug.

3. The air-feed device according to claim 1, wherein the proximal end of the valve rod extends through an opening in a top of the valve body.

4. The air-feed device according to claim 1, further comprising a gland ring around the valve rod that seals a space between the valve rod and the valve body.

5. The air-feed device according to claim 4, wherein:
the valve chamber is formed in the valve body as a stepped blind hole, the valve chamber having a narrow end towards the bottom of the valve body and a wide end towards the top of the valve body,
wherein the valve plug and the distal end of the valve rod are located in the narrow end of the valve chamber; and
a salient shoulder of comparable size to an inside diameter of the wide end of the valve chamber and located in the wide end of the valve chamber,
wherein the gland ring presses against an inner circular face of the salient shoulder.

6. A boiler iron comprising:
an iron;
a vapor boiler;
a heating plate;
a wet vapor snoot; and
a three-position guiding valve having a body, the body of the guiding valve including a valve chamber therein, the valve chamber having an air inlet connected to the boiler, and having first and second air outlets
wherein the first air outlet is connected to the wet vapor snoot and the second air outlet is connected to the heating plate;
a valve rod disposed in the valve body and having a proximal end and a distal end; and
a valve plug attached to the distal end of the valve rod, wherein:
when the valve rod is in a first position, the valve plug blocks the valve chamber between the first air outlet and the air inlet, and only the second air outlet is connected to the air inlet through the valve body,
when the valve rod is in a second position, the valve plug blocks the valve chamber between the second air outlet and the air inlet, and only the first air outlet is connected to the air inlet through the valve body, and
when the valve rod is in a third position, the valve plug does not block the valve chamber between any of the first air outlet, the second air outlet and the air inlet, whereby the first air outlet, the second air outlet and the air inlet are all connected to each other through the valve body.

7. The boiler iron according to claim 5, wherein
the guiding valve is disposed in the iron,
the iron further comprises a shift component which selects between the first, second and third positions, and
the shift component presses against the valve rod.

8. The boiler iron according to claim 7, wherein the shift component further comprises:
a button;
a horizontal axle which moves aslant when the button is pressed; and
a locating block connected to the valve rod,
wherein the locating block has a wavy surface for sliding contact with the horizontal axle, and three troughs in the wavy surface correspond to three positions of the valve rod.

9. The boiler iron according to claim 7, wherein the shift component further comprises:
a rotating locating bowl, wherein a breach is provided in a side wall of the locating bowl;
a surface of the breach pressing against the valve rod and having at least two parallel lines; and
a rim connected to the locating block constituting a positioning surface corresponding to three positions of the valve rod.

* * * * *